L. C. REESE.
MACHINE FOR MOLDING DOUGH AND THE LIKE.
APPLICATION FILED JUNE 19, 1916.

1,226,249.

Patented May 15, 1917.
8 SHEETS—SHEET 1.

WITNESSES:
Emelie M. André
Jean Niessen

INVENTOR.
Louis Charles Reese

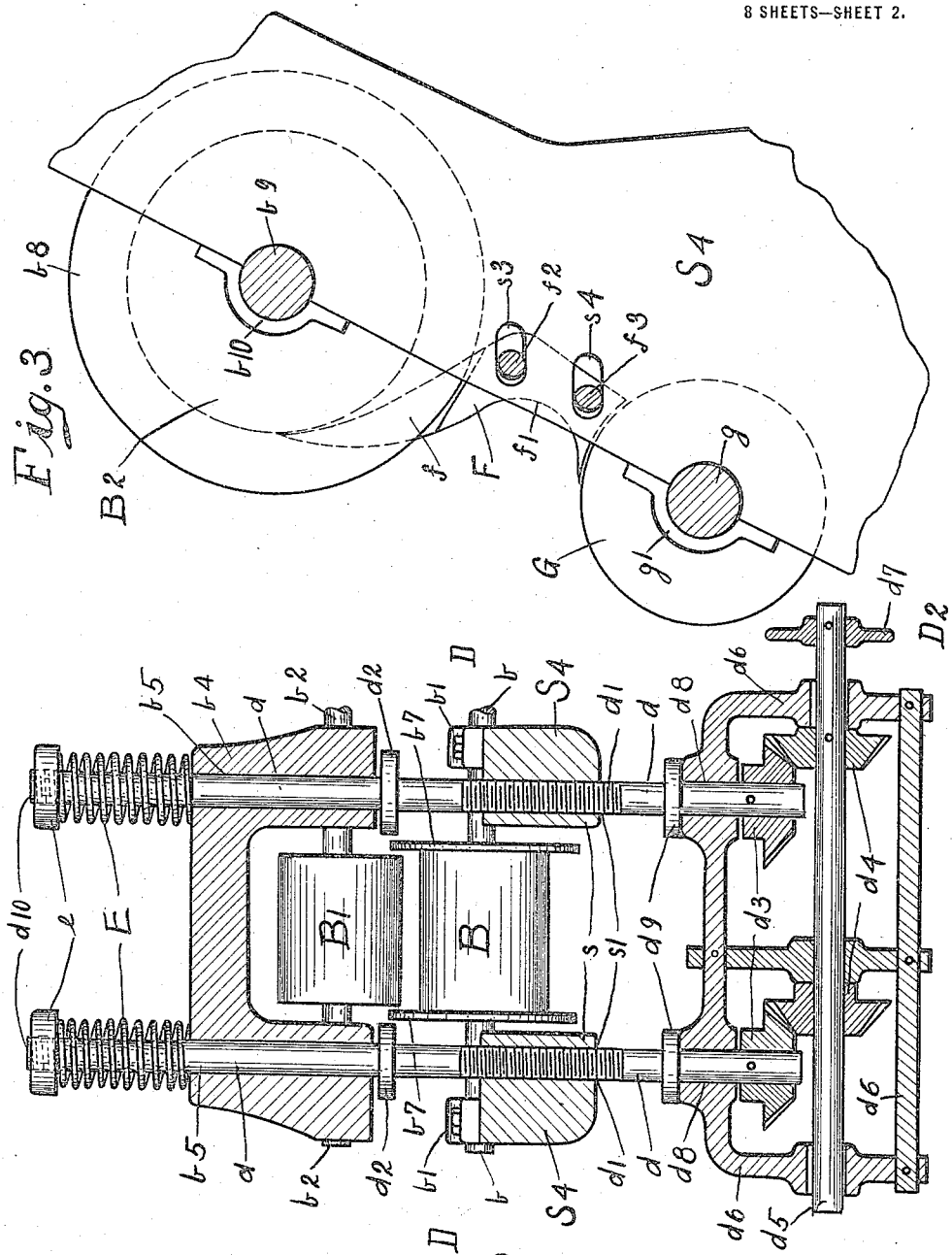

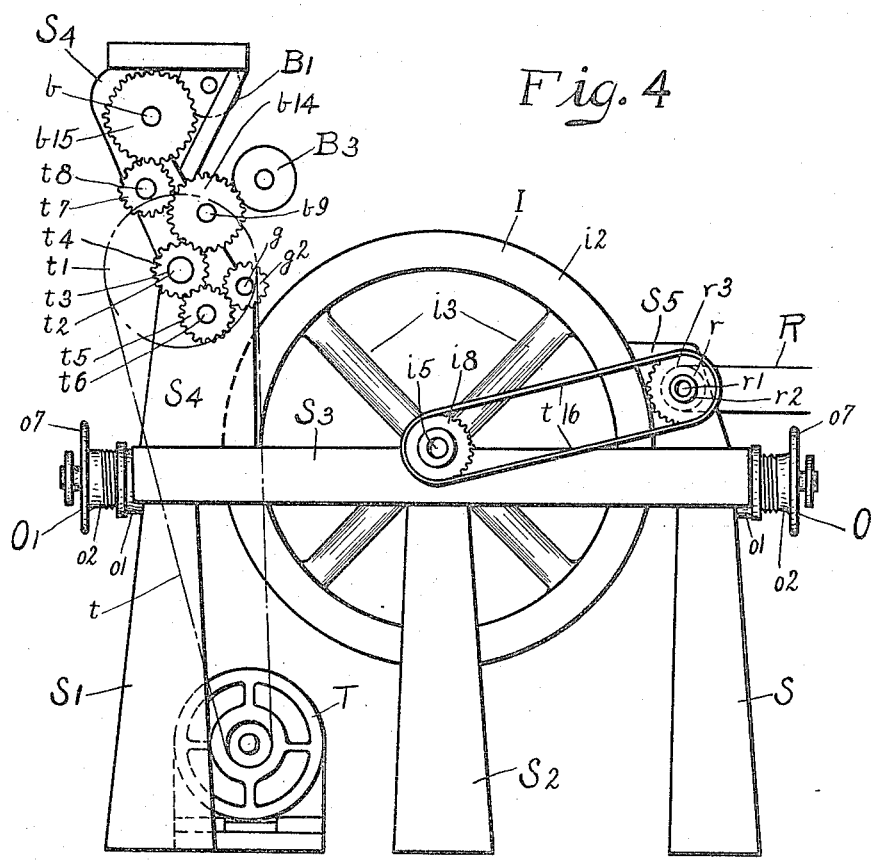

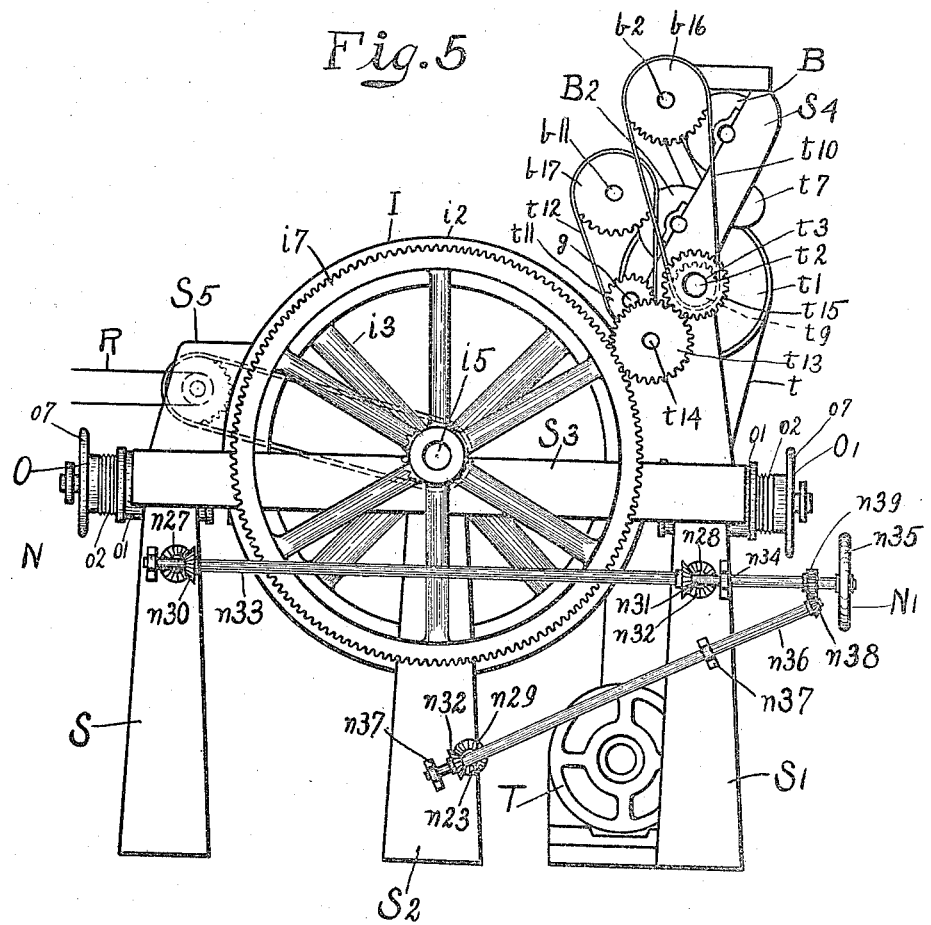

L. C. REESE.
MACHINE FOR MOLDING DOUGH AND THE LIKE.
APPLICATION FILED JUNE 19, 1916.
1,226,249.
Patented May 15, 1917.
8 SHEETS—SHEET 5.
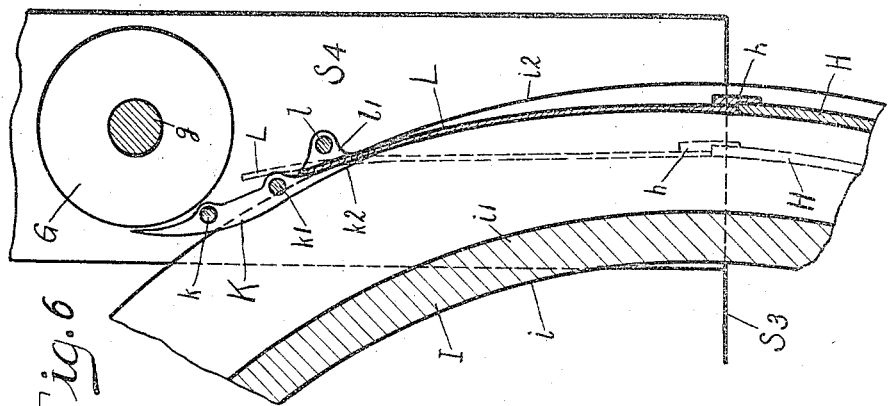
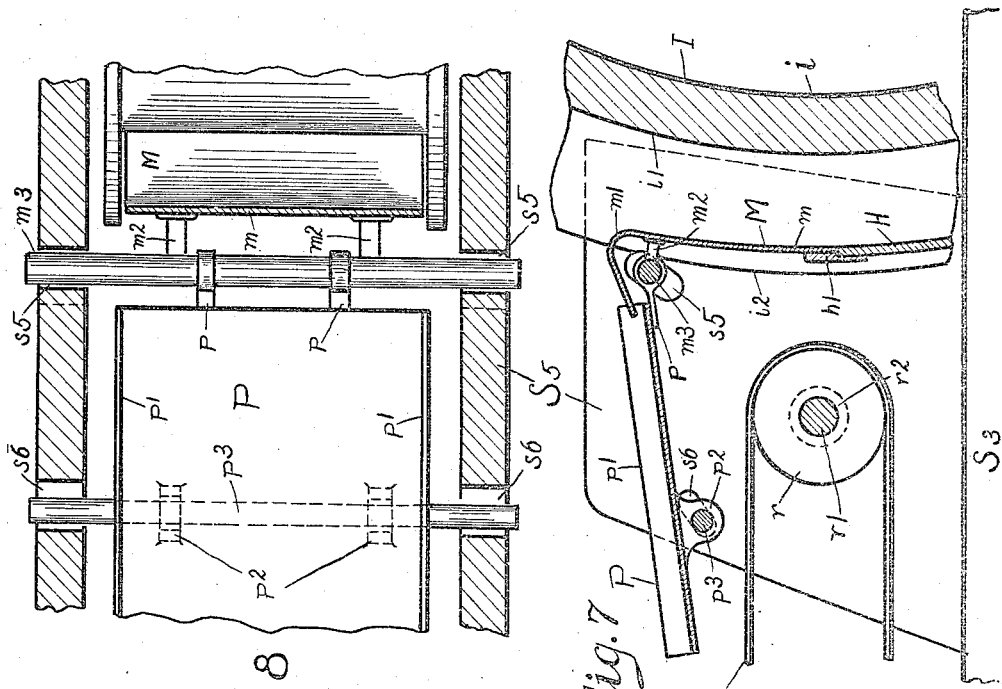
WITNESSES:
Emelie M. André
Jean Thiessen
INVENTOR.
Louis Charles Reese, L. C. REESE.
MACHINE FOR MOLDING DOUGH AND THE LIKE.
APPLICATION FILED JUNE 19, 1916.
1,226,249.
Patented May 15, 1917.
8 SHEETS—SHEET 6.
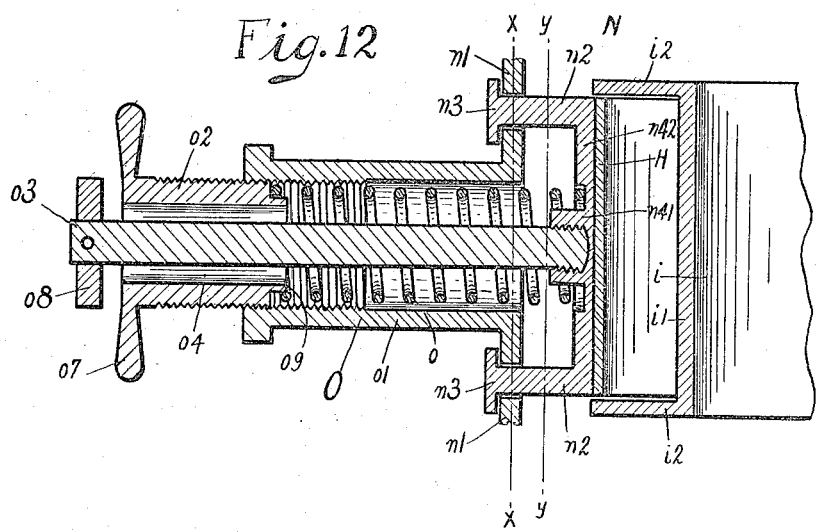
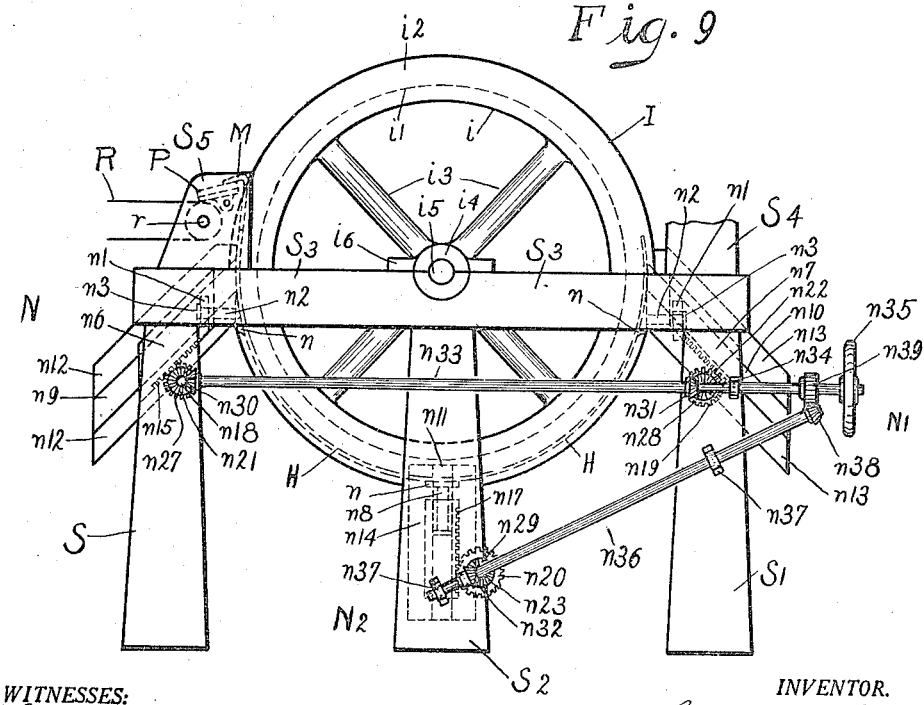
WITNESSES:
INVENTOR.
Louis Charles Reese, L. C. REESE.
MACHINE FOR MOLDING DOUGH AND THE LIKE.
APPLICATION FILED JUNE 19, 1916.

1,226,249.

Patented May 15, 1917.
8 SHEETS—SHEET 7.

WITNESSES:
Emelie M. Andre
Jean Niessen

INVENTOR.
Louis Charles Reese,

L. C. REESE.
MACHINE FOR MOLDING DOUGH AND THE LIKE.
APPLICATION FILED JUNE 19, 1916.

1,226,249.

Patented May 15, 1917.
8 SHEETS—SHEET 8.

WITNESSES:
Emelie M. André
Jean Niessen

INVENTOR.
Louis Charles Reese.

UNITED STATES PATENT OFFICE.

LOUIS CHARLES REESE, OF SAGINAW, MICHIGAN, ASSIGNOR TO WERNER & PFLEIDERER CO., OF SAGINAW, MICHIGAN.

MACHINE FOR MOLDING DOUGH AND THE LIKE.

1,226,249.   Specification of Letters Patent.   Patented May 15, 1917.

Original application filed October 2, 1915, Serial No. 53,842. Divided and this application filed June 19, 1916. Serial No. 104,557.

*To all whom it may concern:*

Be it known that I, LOUIS CHARLES REESE, a resident of Saginaw, in the county of Saginaw and State of Michigan, have invented new and useful Improvements in Machines for Molding Dough and the like, of which the following is a specification.

This invention relates to improvements in machines for sheeting, rolling and finally forming pieces of dough into the required shape, ready for the oven; and its object is to accomplish this result in a more efficient and perfect manner than was hitherto possible in this kind of machines.

I attain these objects by a number of novel and improved devices, mechanisms, arrangements and combinations of parts all of which are fully described on hand of the accompanying drawings specifically produced and in the appended claims.

The main feature of my invention is that in those parts of the machine in which the dough is subjected to considerable pressure, namely, in the dough sheeting and loaf forming operation, I make the parts producing the pressure not only adjustable in regard to their distance from each other, but also resilient by simple adjustable devices, adapted to regulate their resiliency according to the nature of the dough. In the machines of this kind hitherto constructed the openings through which the pieces of dough are pressed, are in most cases made adjustable, but not resilient, so that the dough is forced through without any chance of redress in case the openings should not be in accordance with the nature of the dough. The consequence is that in such cases the whole quantity or larger portion of the carbonic acid-gas which has been formed in the dough by means of the tedious and costly process of fermentation in order to obtain a light and spongy loaf, is forcibly driven out and must be reproduced therein, before it can be put into the baking oven. In my machine on the contrary, in which in consequence of its resilient devices the dough is not exposed to such a severe treatment, the carbonic acid-gas contained in same is completely or for the most part retained, and thus a great saving in time and in raw material by the decomposition of which the carbonic acid gas is formed, is effected.

The drawings represent, as example of the application of the invention, a machine for molding bread dough into tin loaves, but—of course—it will be understood that I do not wish to be limited to this machine specifically, as the invention may be readily adapted and employed with the greatest ease in other machines for molding dough or other plastic material into other shapes and forms.

Fig. 2 is a cross-section of the device for the adjustment and resiliency of each upper roller of the sheeting apparatus.

Fig. 3 represents the dough folding apparatus.

Fig. 4 and Fig. 5 are opposite elevations showing the driving arrangement and gearing of the machine at both sides.

Fig. 6 is a section through the arrangement of the inlet and Fig. 7 of the outlet of the loaf-forming apparatus. Fig. 8 is a plan of the outlet devices.

Fig. 9 is a side elevation of the loaf forming apparatus and of the frame work carrying same showing the arrangement for adjusting the distance between the bottom plate and the face of the reel.

Fig. 12 shows a cross-section of this spring arrangement and its position and working in regard to the reel, the bottom plate and the device for adjusting the distance between the latter and the face of the reel.

Like letters and like letters with like numerals added thereto indicate like parts in all figures.

Figure 1:
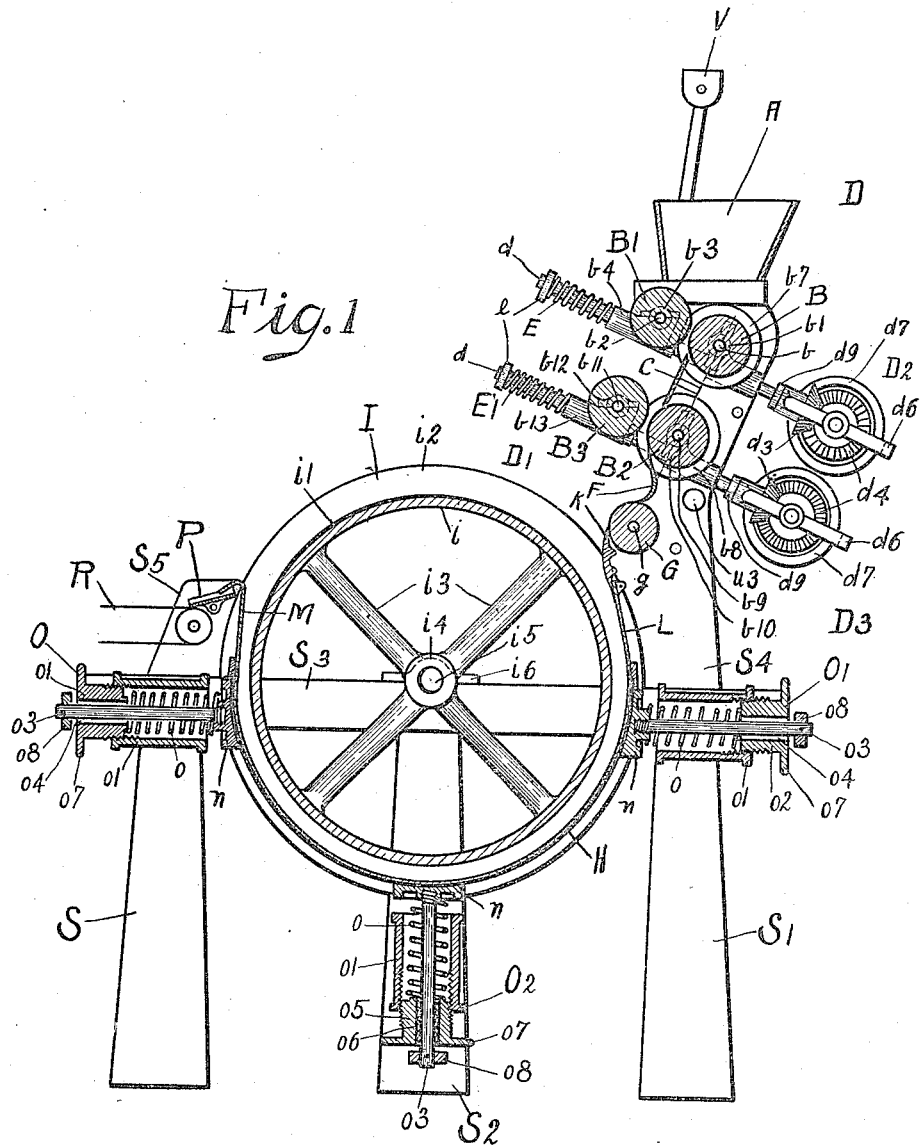
Figure 1 is a side elevation of the machine showing its various parts and their general arrangement, the upper rollers of the dough sheeting apparatus and the bottom-plate of the loaf forming part of the machine being made resilient by spring devices.
Figure 10:
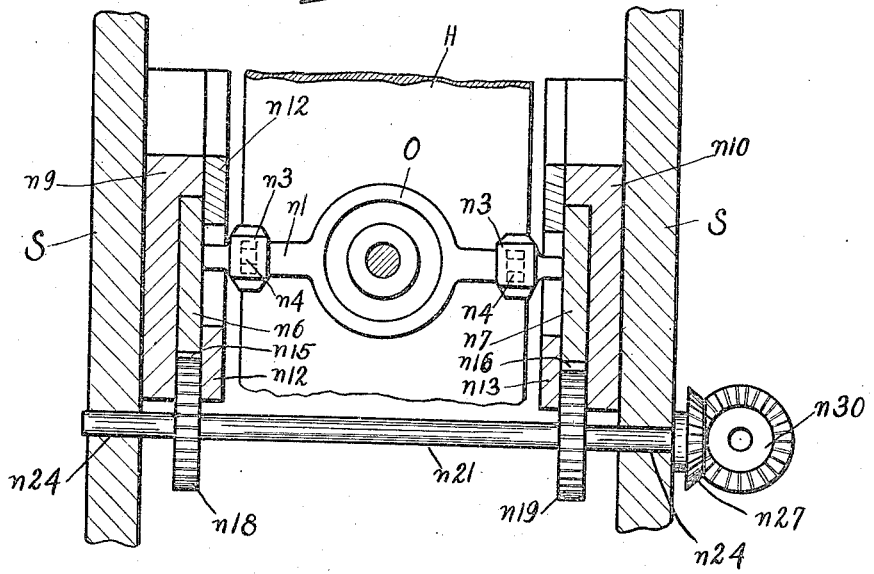
Fig. 10 is a vertical cross-section of the side-adjustment and Fig. 11 a cross-sectional plan of the bottom-adjustment of the bottom plate.
Figure 11:
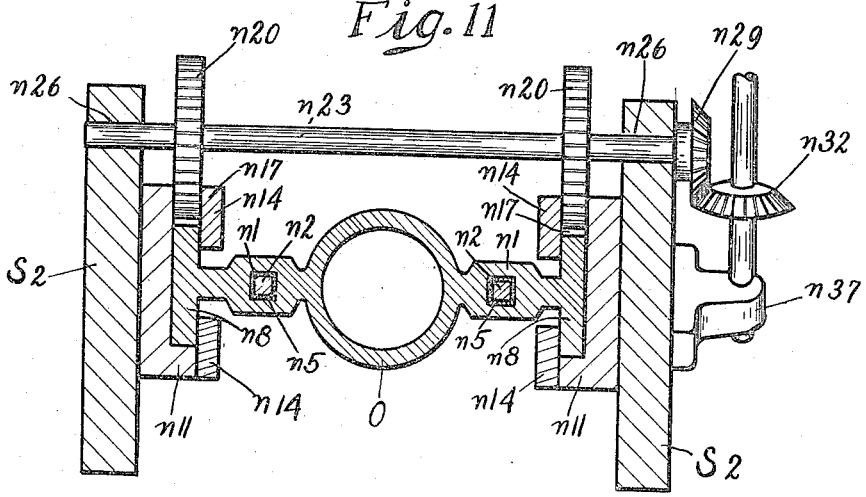

A is the hopper for feeding the machine.

B, $B_1$, $B_2$ and $B_3$ are the brake rollers, between which the dough is rolled out to a sheet, and which, together with the bridge plate C, form the sheeting apparatus of the machine. B and $B_1$ are called the upper pair, and $B_2$ and $B_3$ the lower pair of rollers. $B_1$ and $B_3$ form the top, and B and $B_2$, the bottom rollers. All rollers are rotated in the direction of the dough, that is, downward; therefore B and $B_2$ revolve in opposite direction to $B_1$ and $B_3$. The bottom rollers are provided at their sides with guide plates, which, together with the guide bridge C, lead the dough from the upper pair to the lower pair of rollers and then to the folding apparatus of the machine.

The devices for adjusting the distance between the top and bottom rollers, consist of guide rods arranged at each side of the upper and lower pair of rollers vertically to the sheet of dough and provided with stops on which the guide blocks of the top rollers rest, and with screw threads turning in the female threads of screw blocks fixed to or of projections of the stationary frame work supporting the machine.

The pair of guide rods D serving for the upper pair of rollers are turned simultaneously by the bevel gearing $D_2$ and the pair of guide rods $D_1$ serving for the lower rollers by the bevel gearing $D_3$. In this way, as all the screw threads and bevel wheels are the same, the rods with their stops and thereby the upper rollers are moved to the same degree upward or downward according to the direction in which the bevel-gearing belonging thereto is turned. The guide blocks of the upper rollers are held in position on the stops of the guide blocks belonging thereto by springs E for the roller $B_1$ (Fig. 1 and Fig. 2) and $E_1$ for the top roller $B_3$. The degree of resiliency can be changed by shortening or lengthening these springs.

The completely sheeted piece of dough passes gradually, as it leaves the sheeting rollers, to the folding apparatus in order to be formed into a roll. The sheet of dough moves, guided by the upper convex part of the folding member F onto the folding roller G which, revolving toward the surface of F, throws the dough against the concavity of the curved lower part of F whereby the dough sheet is rolled up. The folding member is preferably made adjustable in order to regulate the position of the member in regard to the folding roller G in accordance with the size of the piece of dough to be worked and of the roll to be produced therefrom. The roll of dough is then definitely formed into the required loaf shape in the molding channel formed by the face and sides of the rotating reel I and the stationary, adjustable bottom plate H with the fixed inlet plate K and the adjustable intermediate plate L at the inlet side, and with the adjustable outlet plate M at the outlet side of the channel.

In order to regulate the size and shape of the cross-section of the above described molding channel according to the weight, volume, density and resiliency of the rolls of dough to be formed to loaves therein, the bottom plate H is provided with the rack-devices N, $N_1$ and $N_2$ (Fig. 9).

When ready adjusted, the bottom plate H is kept in its position by spring devices O, $O_1$ and $O_2$. The resiliency of the bottom plate thus obtained can be regulated by adjusting the length and tension of the springs employed.

P is the chute leading the completely molded loaf of dough from the outlet M of the molding channel to the belt conveyer R carrying it to its destination.

In the framework of the machine S, $S_1$ and $S_2$ indicate the three pairs of legs of the machine carrying at their inner sides the racks of the bottom plate adjustment and at the top the horizontal main frame $S_3$. The latter supports the axle of the molding reel I and the side structures $S_4$ and $S_5$.

$S_4$ carries the hopper A at its top, below same the whole sheeting apparatus, then the folding member H, the axle of the folding roller G, the driving gear of the machine and the inlet-plate K.

$S_5$ serves as support for the oulet plate M, the chute P and the axle of the roller for the belt conveyer R.

T is the electric motor for driving the gearing of the machine.

V represents a flour sprinkler of ordinary construction for dusting the dough when entering the machine.

I am now going to describe the various parts of the machine, their connection with and position toward each other in a more detailed manner.

The hopper A is so constructed and arranged at the top of the framework $S_4$ that the dough pieces dropped thereon slip easily without the slightest hindrance between the rollers B and $B_1$. In the devices D Fig. 2, for adjusting the distance between the rollers B and $B_1$, the guide rods $d$ are provided with the screw threads $d_1$ and held by and turning in the female threads $s_1$ of the projection $s$ on the inner sides of the frame $S_4$. The shaft $b$ of the roller B is carried by the bearings $b_1$ arranged on the stationary frame $S_4$, and the shaft $b_2$ of the roller $B_1$ rotates in bearings $b_3$ provided in the block $b_4$ sliding on the guides $d$ by means of the channels $b_5$ arranged in the block $b_4$. The guides $d$ are provided with the stops $d_2$ to carry the movable block $b_4$ and turned by the bevel gearing $D_2$. The latter consists of the bevel wheels $d_3$ fixed to the end of the guide rods $d$ below the screw threads $d_1$ and engaging with the bevel wheels $d_4$ fixed to the shaft $d_5$ turnable in the frame $d_6$ by means of the hand wheel $d_7$. The frame $d_6$ is provided with the bearings $d_8$ arranged between the bevel wheels $d_3$ and the stops $d_9$ attached to the guide rods $d$, so that, when the hand wheel $d_7$ is turned, the bevel wheels $d_4$ fixed to the shaft $d_5$ remain in gearing with the bevel wheels $d_3$ fixed to the guide rods $d$, the frame $d_6$ being held in position by the bearings $d_8$. Thus, the guide rods $d$ are simultaneously turned in the latter and moved up and down by means of the screw threads $d_1$ and $s_1$, lifting or lowering the block $b_4$ carrying the upper roller $B_1$ at both ends at the same time and to the same degree.

The blocks $b_4$ carrying the upper rollers are kept in their position on the stops $d_2$, Fig. 1 and Fig. 2, by means of the springs E and $E_1$, the tension of which can be adjusted by means of the screw nuts $e$ turning around screw threads $d_{10}$ arranged at the upper part of the guide rods $d$.

The rollers B and $B_2$ are provided at their sides with the circular plates $b_7$, respectively $b_8$, reaching over the lower part of the rollers B, respectively $B_3$, so as not to allow the sheet of dough to become broader than the rollers.

The lower pair of rollers $B_2$ and $B_3$ are equipped with the adjusting device $D_1$ and the springs $E_1$ all of which appliances are constructed in their details and work exactly as those employed for the upper pair of rollers B and $B_1$.

The straight steel plate C, Fig. 1, is fixed to the framework $S_4$ of the machine and constructed of such a shape as to lead the dough treated in the rollers B and $B_1$ from between the side plates $b_7$ to the rollers $B_2$ and $B_3$ in between the side plates $b_8$ of the roller $B_2$.

The shaft $b_9$ of the roller $B_2$ turns in the bearings $b_{10}$ (Fig. 1) arranged at the stationary framework $S_4$, and the shaft $b_{11}$ of the roller $B_3$ in the bearings $b_{12}$ carried by the movable block $b_{13}$ sliding on the guide rods of the adjusting device $D_1$.

The upper part $f$ of the folding member F is shaped to receive the dough from between the rollers $B_2$ and $B_3$ and must therefore fit between the side plates $b_8$ of the roller $B_2$, while the lower curved part $f_1$ of F has the width of the folding roller G. The folding member F is attached to the frame $S_4$ by means of the screw studs $f_2$ and $f_3$ provided at each side of F. For adjusting the position of F, the slots $s_3$ and $s_4$ are provided at each side of the frame $S_4$ for the studs $f_2$ and $f_3$.

In order to fix the plate F in its adjusted position, it is clamped to the supports $S_4$ by any known means, for instance screw nuts fitting over the threaded ends of the studs $f_2$ and $f_3$ protruding outside the supports $S_4$, and pressing against same.

The folding roller G rotates preferably quicker than the sheeting rollers $B_2$ and $B_3$ and has preferably a corrugated surface. Its shaft $g$ turns in bearings $g_1$ arranged on the framework $S_4$.

The electric motor T drives by means of the belt $t$ the main pulley $t_1$ fixed to the main shaft $t_2$ rotating in bearings $t_3$ arranged in the framework $S_4$ (Figs. 1, 4 and 5).

On that end which carries the driving pulley $t_1$ (Fig. 4,) the driving shaft $t_2$ is provided with the gear wheel $t_4$ which meshes with the gear wheel $b_{14}$ fixed to the shaft $b_9$ of the roller $B_2$, which is thus rotated; $t_4$ also meshes with the idler $t_5$ rotating around the lug $t_6$ arranged at the framework $S_4$ and meshing with the gear wheel $g_2$ fixed to the shaft $g$, and thus drives the roller G. The gear wheel $b_{14}$ meshes with the idler $t_7$ rotating around the lug $t_8$ fixed to the framework $S_4$, and, meshing with the gear wheel $b_{15}$ arranged at the shaft $b$, drives the roller B.

In Fig. 4 the gear wheel $g_2$ driving the folding roller G is shown as being of half the size as the gear wheel $b_{14}$ driving the roller $B_2$, and, both being driven—$b_{14}$ directly and $g_2$ through the idler $t_5$—by means of the gear wheel $t_4$ fixed to the main driving shaft of the machine, the folding roller G rotates with double the velocity as the sheeting roller $B_2$ does.

On the opposite side of the driving pulley $t_1$ (Fig. 5) the driving shaft $t_2$ carries the sprocket wheel $t_9$ which by means of the chain $t_{10}$ drives the sprocket wheel $b_{16}$ attached to the shaft $b_2$, and thus the roller $B_1$, and the driving shaft $g$ of the folding roller G carries the sprocket wheel $t_{11}$ which by means of the chain $t_{12}$ drives the sprocket wheel $b_{17}$ fixed to the shaft $b_{11}$, and thereby the roller $B_3$.

The reel I consists of the ring $i$ the face of which is indicated by the letter $i_1$, and the two sides $i_2$ of the rim. The ring $i$ is supported by the spokes $i_3$ and the crown $i_4$ fixed on the axle $i_5$ passing through the center of $i$. The axle $i_5$ revolves in bearings $i_6$ arranged at the horizontal framework $S_3$ of the machine. The reel I is rotated by means of the gear wheel $i_7$ fixed to the axle $i_5$ and meshing with the idler $t_{13}$ rotating around the lug $t_{14}$ fixed to the frame $S_4$ and meshing with the gear wheel $t_{15}$ attached to the driving shaft $t_2$ of the machine on the side opposite to the driving pulley, (Fig. 5).

The bottom plate H fits loosely into the channel formed by the face $i_1$ and the sides $i_2$ of the reel I and, following in outline the circumference of the lower half of the latter, is the bottom of the molding or loaf-shaping channel of the machine. At the inlet side for the dough to the channel the bottom plate H is connected by means of the cross bar $h$ with the intermediate plate L made of thin flexible steel, and at the outlet side for the dough from the channel, by means of the cross bar $h_1$ with the outlet plate M made of the same material as L. (Fig. 6 and Fig. 7.)

The inlet plate K has nearly the width of the molding channel, fitting loosely into the same, and is curved following the circumference of the reel; it is fixed to the framework $S_4$ by means of the screw studs $k$ and $k_1$ arranged at each side of the plate. (Fig. 6.)

The inlet plate K ends in the knife-like edge $k_2$ between which and the cross bar $l$ arranged at the framework $S_4$ the intermediate plate L is able to slide, following the movements of the bottom plate H. The cross bar $l$ is provided with the lugs $l_1$ nearly touching the rim $i_2$ of the reel, in order to prevent any side slip of the plate L. Fig. 6 shows the latter and the bottom plate in two different positions fully explaining the working of the arrangement just described.

Figure 15:
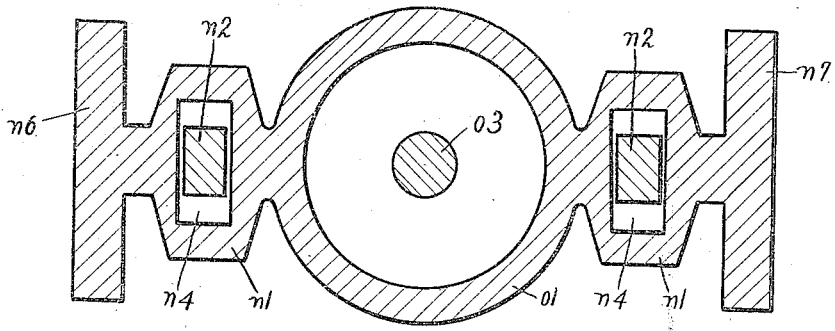
Fig. 15 is an enlarged vertical section of the spring casing and side-bearer bars through the line X—X of Fig. 12
Figure 16:
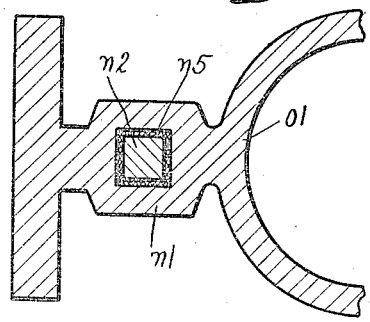
Fig. 16 is the same section of the spring casing and the bottom bearer-bar.

The rack devices (Fig. 9) N and $N_1$ serve to adjust the sides, and the rack devices $N_2$ the lowest point of the bottom plate H. The guide blocks $n$ are the same for all these devices, while the bearer bars $n_1$ which with the guide blocks $n$ form the immediate support of the bottom plate H, differ from each other, the bars $n_1$ belonging to the side devices N and $N_1$ being provided with slots $n_4$ (Fig. 16) to give some play to the guide rods $n_2$ of the guide blocks $n$, while the bearer bar $n_1$ belonging to the bottom device has closely fitting openings $n_5$ (Fig. 15) in which the guide rods $n_2$ move like in a stuffing box.

The guide rods $n_2$ for the sides of the bottom plate H are horizontal and slide in slots giving vertical play, while those arranged at the lowest point of H are vertical and slide in tight vertical openings. The guide rods $n_2$ are provided with stop plates $n_3$ (Fig. 12) against which the bearer bars $n_1$ are pressed by the spring devices O, $O_1$ and $O_2$ (Fig. 1.)

The bearer barns $n_1$ employed at the sides of the bottom plate H are fixed at one end to the sliding racks $n_6$ and at the other end to the sliding racks $n_7$. The racks $n_6$ and $n_7$ move in channels formed by the back blocks $n_9$ and $n_{10}$ securely fastened to the legs S, respectively $S_1$ of the framework of the machine, and by the stop blocks $n_{12}$ and $n_{13}$. These channels slant upward toward the bottom plate H, so that, when the racks are moved in the channels upward and toward the bottom plate H, the latter is lifted while its distance from the face $i_1$ of the reel I is diminished, and that, when the racks are moved downward and away from the bottom plate H, the latter is lowered, while the distance between same and the face $i_1$ is increased.

The angle which the line in which the racks move, forms with the horizontal line, is a function of the diameter of the circle the bottom plate is part of, and of the required limits of the adjustment of the bottom plate H in regard to the face $i_1$ of the reel I.

In Fig. 9 for instance the racks N, $N_1$ and $N_2$ and their gearing have been so arranged that all the points of the bottom plate H are at any position thereof equally distant from the face $i_1$ of the reel I. When the plate H standing at its lowest point, the limit farthest away from the face of the reel, is lifted by means of the rack $N_2$ vertically upward to its highest point, the limit nearest to the face of the reel, the sides of the plate H must be moved the same amount toward the face of the reel, and therefore the racks N and $N_1$ must compress these sides—$N_1$ at the inlet and N at the outlet of the molding channel—this same distance. By these lifting and compressing movements of the plate H the diameter of the circle of which it forms a half, and the center of which is identical with the center of the reel I, is shortened by double the length of the distance for which the plate H was moved, that is double the distance of the limits of its possible adjustments. Thus, each top point of the half circle of the plate H is lifted above its horizontal center line a distance equal to one fourth of the difference of the circumferences of the two circles of which the plate H at its position nearest to and farthest away from the face $i_1$ of the reel I is a part. The angle which the racks N and $N_1$ moving the sides of the bottom plate H make with the horizontal, is therefore in this example equal to the angle formed by the hypotenuse and the horizontal base of a right-angled triangle, the length of the base being equal to the difference of the limits of the possible adjustments of the plate H, and the length of the upright of this triangle being equal to one fourth of the difference of the circumferences of two circles the diameters of which are those of the plates H when at the limit nearest to and at the limit farthest away from the face $i_1$ of the reel I.

The teeth $n_{15}$ and $n_{16}$ of the racks $n_6$ and $n_7$ mesh with the teeth of the pinions $n_{18}$ and $n_{19}$ fixed to the common shaft $n_{21}$ on one side and the common shaft $n_{22}$ on the opposite side of the bottom plate H. These shafts are rotated in bearings $n_{24}$ and $n_{25}$ arranged in the legs S and $S_1$ of the framework of the machine and bear at the part situated outside the same, bevel wheels $n_{27}$ and $n_{28}$ meshing with the bevel wheels $n_{30}$ and $n_{31}$ both of which are fixed to the shaft $n_{33}$, turned by means of the hand wheel $n_{35}$ in bearings carried by brackets $n_{34}$ fixed to the legs S and $S_1$ of the machine. The bevel wheels $n_{30}$ and $n_{31}$ are arranged on the shaft $n_{33}$ in such a manner that they work in opposite direction to each other turning the pair of pinions $n_{18}$ and $n_{19}$ situated at one side of the bottom plate H in opposite direction to the other pair situated at the opposite side; thus, the sides of the bottom plate H are moved to or from its center and lifted at the same time by simply turning the hand wheel $n_{35}$.

The bearer bar $n_1$ holding the lowest point of the bottom plate H, is fixed to the pair of racks $n_8$ sliding in a vertical direction in the channels formed by the back blocks $n_{11}$ and the stop blocks $n_{14}$. The back blocks $n_{11}$ are attached to the center legs $S_2$ of the machine. The teeth $n_{17}$ of the racks $n_8$ mesh with the pinions $n_{20}$ fixed to the common shaft $n_{23}$ which turns in the bearings $n_{26}$ arranged in the legs $S_2$ of the framework of the machine and carries at the same side of the latter at which the shaft $n_{33}$ and hand wheel $n_{35}$ are attached, the bevel wheel $n_{29}$ meshing with the bevel wheel $n_{32}$ fixed to the shaft $n_{36}$ turning in bearings of the supports $n_{37}$ attached to the legs S and $S_2$ of the machine. The shaft $n_{36}$ is provided at its upper end with the bevel wheel $n_{38}$ meshing with the bevel wheel $n_{39}$ fixed to the shaft $n_{33}$ so that by turning the hand wheel $n_{35}$ also these bevel wheels and pinions are moved, and thereby the bottom bearer bar $n_1$ and the lowest point of the bottom plate H are adjusted in a vertical direction.

In the construction shown in the drawings, the bevel wheels $n_{27}$, $n_{28}$, $n_{29}$, $n_{30}$, $n_{31}$, $n_{32}$, $n_{38}$ and $n_{39}$ are arranged so that the shafts $n_{21}$, $n_{22}$ $n_{23}$ they simultaneously drive when the hand wheel $n_{35}$ is turned, revolve with exactly the same velocity, and that the two side pairs of pinions $n_{18}$ and $n_{19}$ fixed to the shafts $n_{21}$ and $n_{22}$ are of such a size in regard to the bottom pair of pinions $n_{20}$ fixed to the shaft $n_{23}$ that by means of the racks $n_6$ and $n_7$ the two bearer bars $n_1$ of the side adjustments N and $N_1$ and thereby the sides of the bottom plate H are moved in relation to the face $i_1$ of the reel I to the same degree as by means of the rack $n_8$, the bearer bar $n_1$ of the bottom adjustment $N_2$, and thereby the lowest point of the plate H. In this way the distance between the face $i_1$ of the reel I and the bottom plate H remains the same at all points at any position of the latter.

If it is desired that this distance can be adjusted differently at different points, then the above named bevel wheels and pinions must be constructed and arranged accordingly.

Figure 17:
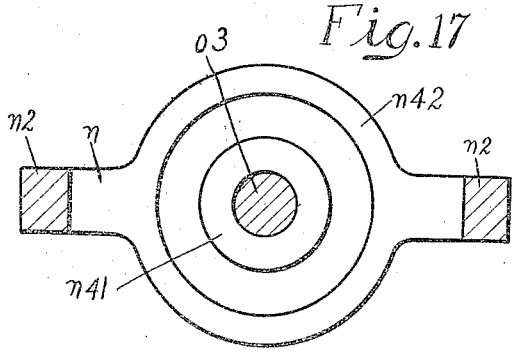
Fig. 17 is a section of the guide-block attached to the bottom plate on line Y—Y of Fig. 12.
Figure 13:
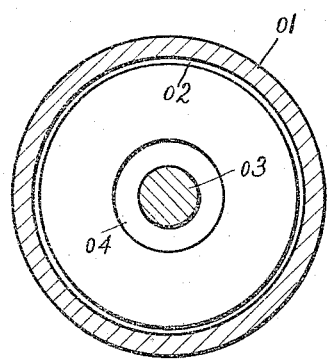
Fig. 13 is a cross-section through the spring casing and the screwblock adjusting the spring as arranged at the sides of the bottom plate.
Figure 14:
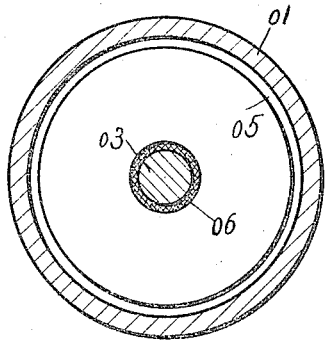
Fig. 14 is a cross-section through the same appliances as employed at the bottom of the bottom plate.

The springs $o$ (Figs. 1 and 12) of the spring arrangements O, $O_1$ and $O_2$ are contained in casings $o_1$ attached to the middle parts of the bearer bars $n_1$, their cross-section thus forming a ring (Figs. 13 and 14). The springs $o$ are held in the casings $o_1$ by means of screw blocks and guided by guide rods $o_3$ screwed into the tubelike elevation $n_{41}$ of the guide blocks $n$. The casings $o_1$ and the guide rods $o_3$ (Fig. 1) of the two side appliances O and $O_1$ point in horizontal direction, and the openings $o_4$ in their screw blocks $o_2$ through which the guide rods $o_3$ pass, are widened so as to give the latter a certain play (Fig. 12 and Fig. 13), while the bottom appliance $O_2$ points vertically downward, and its screw block $o_5$ has an opening $o_6$ just large enough for the guide rod $o_3$ to pass through like through a stuffing box (Fig. 14). The screw blocks $o_2$ and $o_5$ are turned in the female threads provided in the upper part of the casing $o_1$ by means of the handles $o_7$. In order to prevent the screw blocks from slipping from the guide rods $o_3$ and out of the casings $o_1$, the former are provided at their end with cross bars $o_8$. The spring ends at the screw blocks $o_2$ and $o_5$ are kept in their place inside by the ringlike projections $o_9$ and outside by the casing $o_1$, and the spring ends at the bottom plate H are held in position in the annular cavity of the guide blocks $n$ between the tubular projections $n_{41}$ and the wider ringlike projection $n_{42}$ (Fig. 17). The resiliency of the bottom plate H can be adjusted by adjusting the tension of the springs $o$ by means of the screw blocks $o_2$, respectively $o_5$.

The outlet plate M (Fig. 7 and Fig. 8) connected by the cross-piece $h_1$ to the bottom plate H as already mentioned above, has an upward pointing part $m$ which forms the end part of the molding channel, and is bent over at the top $m_1$ for the ready molded loaf of dough to slip over same into the outlet chute P.

At its upper part the outlet plate M is provided with two studs $m_2$ carrying the cross bar $m_3$ sliding in the slots $s_5$ arranged in the frame work $S_5$. This cross bar $m_3$ supports two hinges $p$ attached to the outlet chute P which consists of a straight iron plate provided at each side with a rim $p_1$ to guide the dough loaf onto the conveyer R. The chute is provided at its lower side with brackets $p_2$ carrying the cross bar $p_3$ sliding in the slots $s_6$ arranged in the framework $S_5$. By means of the rod $m_3$ and the slots $s_5$, the top $m_1$ of the outlet plate M is always kept in its proper position above the chute P while moving upward or downward with the bottom plate H, the chute P following these movements at the same time.

The roller $r$ of the belt conveyer R (Fig. 4) rotates around its axle $r_1$, running in bearings $r_2$ provided on the part $S_5$ of the framework, and is driven by means of the sprocket wheel $r_3$ attached to the axle $r_1$, and the chain $t_{16}$ from the sprocket wheel $i_8$ fixed to the axle $i_5$ of the reel I.

For operating the machine, at first the different parts of the same must be adjusted according to the weight, size and qualities of the pieces of dough to be molded and to the size and shape of the ready molded loaf to be obtained from the piece of dough placed into the machine. In the machine shown in the drawings, the distance of the two pairs of rollers, B and $B_1$, and $B_2$ and $B_3$, are regulated by turning the hand wheels $d_7$ belonging to their adjustment arrangements, and the resiliency of the upper rollers $B_1$ and $B_3$ is adjusted by turning the screws $e$ belonging thereto. The folding member F is adjusted by means of the screws $f_2$ and $f_3$. The size of the molding channel is regulated by turning the hand-wheel $n_{35}$, and the resiliency of the bottom plate H by adjusting the screw blocks $o_2$, respectively $o_5$ of the spring adjustments $O$, $O_1$ and $O_2$.

The pieces of dough to be shaped into loaves are then placed, one after the other, into the hopper A, from which they enter the sheeting apparatus; they are rolled out to a sheet between the rollers B and $B_1$ and $B_2$ and $B_3$; the resulting sheets are folded up into cylindrical rolls by means of the folding roller G and folding member F and pass then over the inlet plate K into the funnel-like passage formed by the lower part of the plate K and the intermediate plate L with the face $i_1$ of the rotating reel I, and from there into the molding channel proper formed by the latter and the stationary resilient bottom plate H. The ready-shaped loaves of dough leave then through the upper part of the molding channel formed by the face $i_1$ of the reel and the outlet plate M, and drop over the top $m_1$ of the latter onto the chute P and the conveyer R which takes them to their destination.

I claim:

1. In a dough molding machine, the combination with a rotary reel of a non-revolving, adjustable bottom plate fitting loosely into the space between the rims of the said reel, following the lower half of its circumference and forming as bottom with same the molding channel, a stationary curved inlet plate fixed to the framework of the machine, convex in its upper part and following the circumference of the reel in its lower part, so as to facilitate the entrance of the rolled pieces of dough into the molding channel, a flexible intermediate plate fixed at its lower end to the top of the bottom plate and moving at its upper part loosely between the lower edge of the inlet plate and a rod attached to the framework of the machine, thus forming at any position of the bottom plate a funnel-like entrance into the molding channel, means consisting of racks for adjusting the depth of this channel, and resilient means consisting of adjustable springs for keeping this depth.

2. In a dough molding machine, the combination with a rotary reel of a non-revolving bottom plate fitting loosely into the space between the sides of the said reel and forming as bottom with same the molding channel, a stationary curved inlet plate fixed to the framework of the machine and constructed so as to facilitate the entrance of the dough into the molding channel, a flexible, intermediate plate fixed at its lower end to the top of the bottom plate and moving at its upper part loosely between the lower edge of the stationary inlet plate and a rod attached to the framework of the machine, a flexible outlet plate fixed at its lower end to the upper part of the bottom plate opposite to the inlet plate, and provided with a turned-over top so as to facilitate the exit of the ready molded loaves of dough, a rod fixed across the back of the upper part of the outlet plate, the protruding ends of this rod moving in slots so arranged in the framework of the machine that the width of the outlet opening between the face of the rotating reel and the top of the outlet plate remains always the same at any position of the bottom plate, means consisting of racks for adjusting the depth of the molding channel and resilient means consisting of adjustable springs for keeping this depth.

3. In a dough molding machine comprising rotary adjustable rollers adapted to roll out the dough to a sheet, means consisting of screwrods with stops and bevel gearing for adjusting the distance between each pair of such rollers, resilient means consisting of adjustable springs for keeping this distance, a curved, adjustable folding member, a folding roller revolving toward the concavity of the folding member and quicker than the sheeting rollers, and arranged so in regard to the latter and to the folding member that the sheet of dough coming from the former is driven into the concavity of the latter and thus rolled up, a rotary reel, a plate fitting loosely between the sides of the reel and forming with its face and sides the molding channel, means consisting of racks for adjusting the distance of this plate from the face of the reel, and resilient means consisting of adjustable springs for keeping this distance.

4. In a dough molding machine, the combination with a rotary reel, of a bottom plate fitting loosely between the sides of the reel and thus forming the bottom of the molding channel, guide rods arranged at the said plate pointing outward and provided with stops, adjustable bars stationary while the machine is at work, provided with openings for the guide rods to slide in and so arranged in regard to the latter that those parts containing the openings are situated between the stops of the guide rods and the bottom-plate, racks sliding in guide blocks fixed to the framework of the machine, carrying the said bars and adapted simultaneously to adjust these bars and thereby the depth of the molding channel, and springs contained in stationary casings so arranged in regard to the bottom plate and so adapted that they press the stops of the guide rods against the bars in the openings of which these rods slide.

5. In a dough molding machine, the combination with a rotary reel, of a bottom plate fitting loosely between the sides thereof and thus forming the bottom of the molding channel, guide rods arranged at the said plate pointing outward and provided with stops, adjustable bars—stationary while the machine is at work—provided with openings for the guide rods to slide in and so arranged that those parts containing the openings are situated between the stops of the guide rods and the bottom plate, racks sliding in guide blocks fixed to the framework of the machine, carrying the said bars and adapted simultaneously to adjust these bars and thereby the depth of the molding channel, springs so arranged in regard to the latter and so adapted as to press the stops of the guide rods against the bars in the openings of which the rods slide, and casings containing the said springs and attached to the said bars.

6. In a dough molding machine, the combination with a rotary reel, of a bottom plate fitting loosely between the sides thereof and thus forming the bottom of the molding channel, guide rods arranged at the said plate, pointing outward and provided with stops, adjustable bars—stationary while the machine is at work,—provided with openings for the guide rods to slide in and so arranged in regard to the latter that those parts containing the openings are situated between the stops of the guide rods and the bottom plate, racks sliding in guide blocks fixed to the framework of the machine, carrying the said bars and adapted simultaneously to adjust these bars, and thereby the depth of the molding channel, springs so arranged in regard to the latter and so adapted as to press the stops of the guide rods against the bars, in the openings of which the guide rods slide, tubular casings containing the springs and provided with female threads, and screw blocks meshing with these threads and so arranged that by turning them the tension of the springs is adjusted.

7. In a dough molding machine, the combination with a rotary reel, of a bottom plate, following the lower circumference of the said reel and fitting loosely between the sides thereof, thus forming the bottom of the molding channel, three blocks arranged across—one at each side and one at the lowest point of the said plate—, two guide rods arranged at the end of each of these blocks, a tubelike projection arranged in the center of each such guide block, a ring like projection arranged between the center and the ends of each guide block, a guide rod fastened in the tubelike projection of each guide block, three bearer bars adjustable by rack devices, stationary while the machine is at work,—one at each side and one at the lowest point of the plate, provided with openings for the guide rods to slide in and arranged parallel to the guide blocks in such a way that those parts of the said bars containing the openings for the guide rods are situated between the stops of the guide rods and the guide blocks themselves, tubular spring casings connected to the middle part of the bearer bars in such a way that the guide rods arranged in the center of the guide blocks pass through the center of the said casings, female threads provided therein, screw blocks meshing with these threads and provided in their center with openings for the center guide rods to slide in, end springs fitting over the latter and held within the casings, one end of the springs resting on the screw blocks and the other end in the grooved part contained between the tubular projection in the center and the surrounding annular projection of the guide blocks.

8. In a dough molding machine, the combination with a rotary reel, of a bottom plate forming with the face and sides of same the molding channel, three blocks arranged across—one at each side and one at the lowest point of the said plate, guide rods connected to each end of such guide blocks, pointing vertically downward at the lowest point and in a horizontal direction at the sides of the bottom plate and provided with stops, three bearer bars adjacent and parallel to the guide blocks and provided with openings for the guide rods to slide in, the parts containing these openings being situated between the stops of the guide rods and the guide blocks, two inclined racks at each side of the bottom plate slanting upward toward same and carrying the bearer bars belonging thereto, two vertical racks at the lowest point of the plate, carrying the bearer bars belonging thereto, pinions working the racks, three springs each so adapted and arranged as to press the stops of the guide rods against the bearer bars, guide rods fixed one to the center of each guide block for the springs to slide on, spring-casings—one for each spring—suitable to hold same and attached to the middle part of the bearer bars, and screw blocks fitting to the threads of the spring casings, provided with openings at the center for the center guide rods to slide in and arranged to hold down the springs and to adjust, when turned, the tension of the latter.

9. In a dough molding machine, the combination with the molding channel formed by the face $i_1$ and the sides $i_2$ of the reel I and the bottom plate H, of three blocks $n$ fixed, one at each side and one at the middle of the plate H, guide rods $n_2$ pointing outward, one at each end of the guide blocks $n$, stop plates $n_3$ attached to the ends of the guide rods $n_2$, three bearer bars $n_1$, each provided with slots,—one pair of slots $n_4$ being in each side—, and one pair $n_5$ in the bottom bearer bar—for the guide rods $n_2$ to slide in, three springs $o$, two at each side and one at the middle, contained in casings $o_1$ attached to the center of the bearer bars $n_1$, pressing the latter away from the plate H on which the said springs rest, and thus the stop plates $n_3$ against the said bearer bars, three pairs of racks fixed to the framework of the machine and carrying the bearer bars $n_1$, the two pair of racks carrying the side bearer bars $n_1$ consisting of the racks $n_6$ and $n_7$ inclined toward the reel I, and the pair of racks carrying the middle bearer bar $n_1$ consisting of the vertical racks $n_8$, $n_8$, and the pinions $n_{18}$, $n_{19}$ and $n_{20}$ working these racks respectively, for adjusting the distance of the plate H from the face $i_1$ of the reel I, substantially as shown.

10. In a dough molding machine, in combination with the molding channel formed by the face $i_1$ and the sides $i_2$ of the reel I and the bottom plate H, blocks $n$ fixed across the plate H, guide rods $n_2$ attached at each end of the said blocks and pointing outward, stop plates $n_3$ attached to the ends of the guide rods $n_2$, tubelike projections $n_{41}$ in the center of the blocks $n$, guide rods $o_3$ fixed therein, ringlike projections $n_{42}$ arranged at the blocks $n$ between the guide rods $n_2$ and the projection $n_{41}$, slots $n_4$ provided in the side—and $n_5$ in the bottom bearer bars, rack pairs consisting of the inclined racks $n_6$ and $n_7$ carrying the side bearer bars and of the vertical racks $n_8$, $n_8$ carrying the bottom bearer bar, spring casings $o_1$ arranged at the bearer bars $n_1$ between the openings $n_4$, respectively $n_5$, screw blocks $o_2$ arranged at the outer ends of the casings $o_1$, openings $o_4$ at the side—and $o_5$ at the bottom screw blocks for the guide rods $o_3$ to slide in, springs $o$ inclosed in the casings $o_1$ and pressing against the blocks $n_1$, all so arranged to adjust the plate H by means of the said racks and to keep it in this position by means of the springs $o$, substantially as shown.

11. A dough molding machine, comprising a feed hopper, rotary rollers arranged in pairs and adapted to roll out the dough fed thereto into a sheet, a stationary frame carrying the lower set of rollers movable blocks for each roller belonging to the upper set, guide rods adapted for these blocks to slide on and adjustably arranged at the said stationary frame, stops provided on the guide rods to hold the movable blocks, springs fitting on the guide rod ends protruding over the blocks and pressing them against the said stops, stationary plates leading the dough sheet from one pair of rollers to the successive one, a curved plate situated underneath the last pair of rollers, a roller rotating quicker than these rollers and toward the concavity of the said curved plate, thus folding up the sheet into a roll, a stationary curved plate adapted to lead the rolls of dough thus produced into the final molding channel, a rotary reel, a bottom plate fitting into the annular channel of said reel, and, following the lower half of its circumference, forming with it the molding channel, a flexible plate fixed to the upper end of the said bottom plate and sliding behind the plate leading the dough rolls into the channel, guide rods arranged at the bottom plate of the molding channel, pointing outward and provided at their ends with stops, bars provided with openings and arranged so that the said guide rods slide therein between the bottom plate to which they are fixed, and their stops, racks carrying the said bars, pinions working the racks, bevel gearing working the pinions simultaneously, springs carried in casings fixed to the bars in the openings of which the guide rods slide, and so arranged as to press the stops of these guide rods against the said bars, thus holding the plate in the position adjusted by means of the racks, a flexible plate fixed to the bottom plate of the molding channel at its outlet end and having a turned over top, and a chute receiving the molded dough loaves from over the top of the latter plate and movably connected to same, both plates being provided with means to follow together the movements of the bottom plate of the molding channel without altering the distance between the turned over top of the said flexible plate from the face of the reel.

12. A dough molding machine comprising the feed hopper A, the brake rollers B, $B_1$, $B_2$ and $B_3$, the bridge plate C, the adjustment devices D and $D_1$, the bevel gearings $D_2$ and $D_3$ working the said devices, the spring devices E and $E_1$, the folding member F, the folding roller G, the rotary reel I, the bottom plate H, the inlet plate K, the intermediate plate L, the outlet plate M, the rack adjustment devices N, $N_1$ and $N_2$, the spring devices O, $O_1$ and $O_2$ and the chute P, substantially as shown and described.

LOUIS CHARLES REESE.

Witnesses:
JEAN NIESSEN,
EMELIE M. ANDRÉ.

Copies of this patent may be obtained for five cents each, by addressing the "Commissioner of Patents, Washington, D. C."